United States Patent
Caia et al.

(10) Patent No.: US 7,154,853 B2
(45) Date of Patent: Dec. 26, 2006

(54) RATE POLICING ALGORITHM FOR PACKET FLOWS

(75) Inventors: Jean-Michel Caia, San Francisco, CA (US); Jing Ling, Fremont, CA (US); Juan-Carlos Calderon, Fremont, CA (US); Vivek Joshi, Sunnyvale, CA (US); Anguo T. Huang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 10/137,753

(22) Filed: May 2, 2002

(65) Prior Publication Data

US 2003/0206522 A1    Nov. 6, 2003

(51) Int. Cl.
*G01R 31/08* (2006.01)
*G06F 11/00* (2006.01)
(52) U.S. Cl. ...................... 370/235; 370/252
(58) Field of Classification Search ................ 370/232, 370/230, 235, 252
See application file for complete search history.

(56) References Cited

U.S. PATENT DOCUMENTS

| | | | |
|---|---|---|---|
| 5,633,861 A | 5/1997 | Hanson | |
| 6,134,218 A * | 10/2000 | Holden | 370/232 |
| 6,208,619 B1 | 3/2001 | Takeuchi | |
| 6,298,041 B1 | 10/2001 | Packer | |
| 6,578,083 B1 * | 6/2003 | Tuck, III | 709/235 |
| 6,741,570 B1 * | 5/2004 | Kojima | 370/253 |
| 6,748,435 B1 * | 6/2004 | Wang et al. | 709/225 |
| 6,771,652 B1 * | 8/2004 | Aydemir et al. | 370/412 |
| 6,778,499 B1 * | 8/2004 | Senarath et al. | 370/232 |
| 7,012,889 B1 * | 3/2006 | Turner et al. | 370/229 |

* cited by examiner

Primary Examiner—Ricky Q. Ngo
Assistant Examiner—Warner Wong
(74) Attorney, Agent, or Firm—Pillsbury Winthrop Shaw Pittman LLP

(57) ABSTRACT

A rate policing algorithm for packet flows is based on counters and threshold checking. The rate policing algorithm utilizes a state machine having four links: (1) compliant state to compliant state; (2) transition from compliant state to non-compliant state; (3) non-compliant state to non-compliant state; and (4) transition from non-compliant state to compliant state. Depending on the values obtained from the counters and utilizing the threshold values, it is determined whether a flow rate for packets is compliant or non-compliant.

28 Claims, 3 Drawing Sheets

IN COMPLAINT STATE CHECKING FOR NON-COMPLIANCY

IN COMPLAINT STATE CHECKING FOR NON-COMPLIANCY

IN NON-COMPLAINT STATE CHECKING FOR COMPLIANCY

RATE POLICING ALGORITHM FOR PACKET FLOWS

BACKGROUND OF THE INVENTION

1. Technical Field

The present invention generally relates to a rate policing algorithm. More particularly, an embodiment of the present invention relates to a rate policing algorithm for packet flows based on counters and threshold checking that may be implemented directly in silicon.

2. Discussion of the Related Art

Clients who pay for bandwidth to run their high-speed network applications want proof that they are receiving the bandwidth rates that they are purchasing. Most rate policing implementations perform complex calculations based on the "leaky bucket" algorithm, which is commonly used to measure rates for Asynchronous Transfer Mode (ATM) cells. (Traffic Management Specification version 4.1 of the ATM Forum, AF-TM-0121.000, March 1999.) "Leaky bucket" is a term used as a description of the algorithm used for conformance checking of cell flows from a user or network. The "leaky hole in the bucket" applies to the sustained rate at which cells may be accommodated, while the "bucket depth" refers to the tolerance to cell bursting over a given time period.

These types of algorithms are complex and difficult to implement in hardware for higher number of flows. Accordingly, there is a need for a rate policing solution that is simpler to implement in hardware, particularly for a high number of flows.

DETAILED DESCRIPTION

Figure 1:
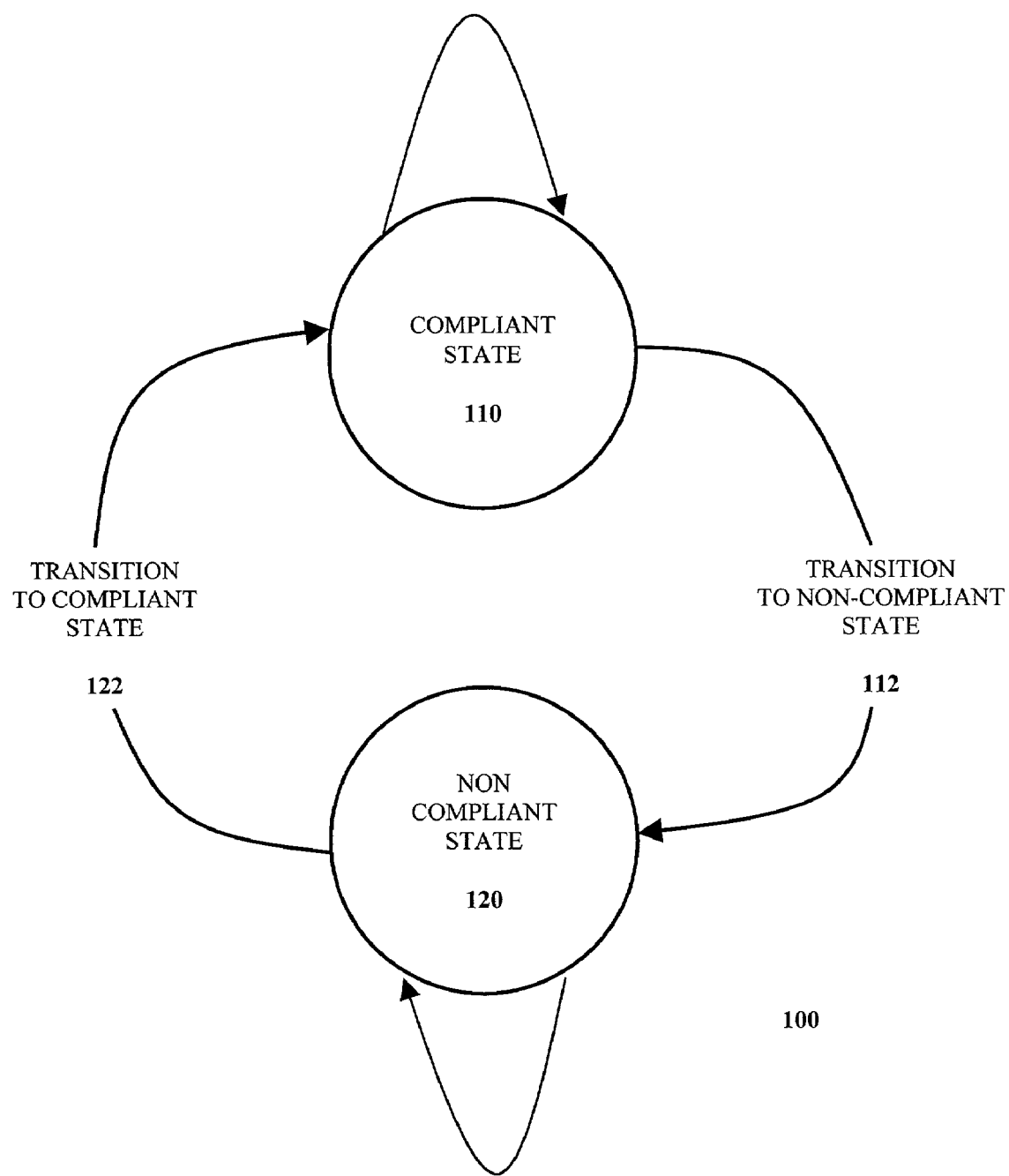
FIG. 1 illustrates a rate-based policing state machine for packet flows according to an embodiment of the present invention.

FIG. 1 illustrates a rate-based policing state machine for packet flows according to an embodiment of the present invention. For packets, rate policing is based on a maximum number of bytes received over a certain period of time, and this receipt over Z consecutive times. A compliant state 110 means that the flow rate is below its programmed threshold; that is, the flow rate policy is met and subsequent packets are not tagged. A non-compliant state 120 means that the flow rate is above its programmed threshold; that is, the flow rate policy is violated and subsequent packets are tagged or dropped. According to an embodiment of the present invention, the state machine 100 has four links: (1) compliant state 110 to compliant state 110; (2) compliant state 110 to non-compliant state 120 (transition state 112); (3) non-compliant state 120 to non-compliant state 120; and (4) non-compliant state 120 to compliant state 110 (transition state 122).

For each flow, counters and threshold values (context information/values) are stored in a control memory regarding rate policy checking. The counters may include: (1) an integration window time counter (WCNT); (2) a multiple windows counter (MWCNT); (3) a time stamp (TS); and (4) a data counter (MBCNT). The thresholds may include: (1) a data counter threshold in compliant state (MBCNT_C_INIT); (2) an integration window time threshold in compliant state (WCNT_C_INIT); (3) a multiple windows counter threshold in compliant state (MWCNT_C_INIT); (4) a data counter threshold in non-compliant state (MBCNT_N_INIT); (5) an integration window time threshold in non-compliant state (WCNT_N_INIT); and (6) a multiple windows counter threshold in non-compliant state (MWCNT_N_INIT).

The integration window time counter (WCNT) is the time interval remaining for flow rate compliancy or non-compliancy checking within an integration window for an amount of data. Each integration window, being a cycle in which compliancy or non-compliancy is checked for a "chunk" of data (e.g., M-bytes of data) in a flow, is sliding (i.e., a new window may be opened before the preceding one is completed) when in the compliant state 110.

The multiple windows counter (MWCNT) is utilized for probability checking. That is, the multiple windows counter (MWCNT) indicates the number of Z consecutive non-compliant or compliant windows that have occurred. The multiple windows counter (MWCNT) may be implemented as a down-counter, counting down to zero for each occurrence of consecutive non-compliant or compliant windows.

The data counter (MBCNT) indicates the receipt of an amount of data (e.g., M-bytes of data) for a particular flow, e.g., flow X. M may be of different values, such as 1 (a byte counter), 4 (a 4-byte counter), 8 (an 8-byte counter), etc. The value of M may be configured based on the level of accuracy required of the receive data flow rating.

The time stamp (TS) is a value indicating the preceding arrival time of the data, e.g., the M-byte of data for this particular flow.

The data counter threshold in compliant state (MBCNT_C_INIT) is the threshold value for flow rate non-compliancy checking to determine whether the flow rate (byte/second) is greater than (MBCNT_C_INIT * M)/(WCNT_C_INIT * clock period), where "*" is a multiplier.

The integration window time threshold in compliant state (WCNT_C_INIT) is the maximum integration window (maximum time interval) for flow rate non-compliancy checking where the integration time is WCNT_C_INIT*clock period.

The multiple windows counter threshold in compliant state (MWCNT_C_INIT) is the number of consecutive sliding windows that violate the flow rate that is necessary to declare a state of non-compliancy.

The data counter threshold in non-compliant state (MBCNT_N_INIT) is the threshold value for flow rate compliancy checking to determine whether the flow rate (byte/second) is less than (MBCNT_N_INIT*M)/(WCNT_N_INIT*clock period).

The integration window time threshold in non-compliant state (WCNT_N_INIT) is the maximum integration window (maximum time interval) for flow rate compliancy checking where the integration time is WCNT_N_INIT * clock period.

The multiple windows counter threshold in non-compliant state (MWCNT_N_INIT) is the number of consecutive sliding windows that do not violate the flow rate that is necessary to declare a state of compliancy.

All of the threshold (INIT) parameters are static parameters (initial values) configured by the network management functions when the flow connection is set up (i.e., these parameters provide to a particular flow its rate policing values). The WCNT, MWCNT, MBCNT, and TS values are counter values/parameters that are updated per flow every time an M-byte chunk of data is received/processed for a particular packet flow. These counters, including the time stamp (TS), are preferably implemented on-chip. Every time the context of a particular flow is retrieved from the control memory (i.e., when M-byte data is received for this flow), the three on-chip counters are updated with the parameters of this particular flow that were stored in the context/control memory. After rate compliancy processing for this flow, the counter values are written back to the control memory of this particular flow. Then, if the next M-byte chunk of data to be processed belongs to a different flow, the on-chip counters and packet rate compliancy machine are loaded with the retrieved context of this different packet flow (information coming from the same context/control memory).

The M value discussed above indicates the granularity used by the packet rate policing. The M value defines the granularity or the number of byte(s) used as the smallest unit to be accounted for in the rate policing calculation. The M value is not specific per flow usually, but is typically a global parameter.

Figure 2:
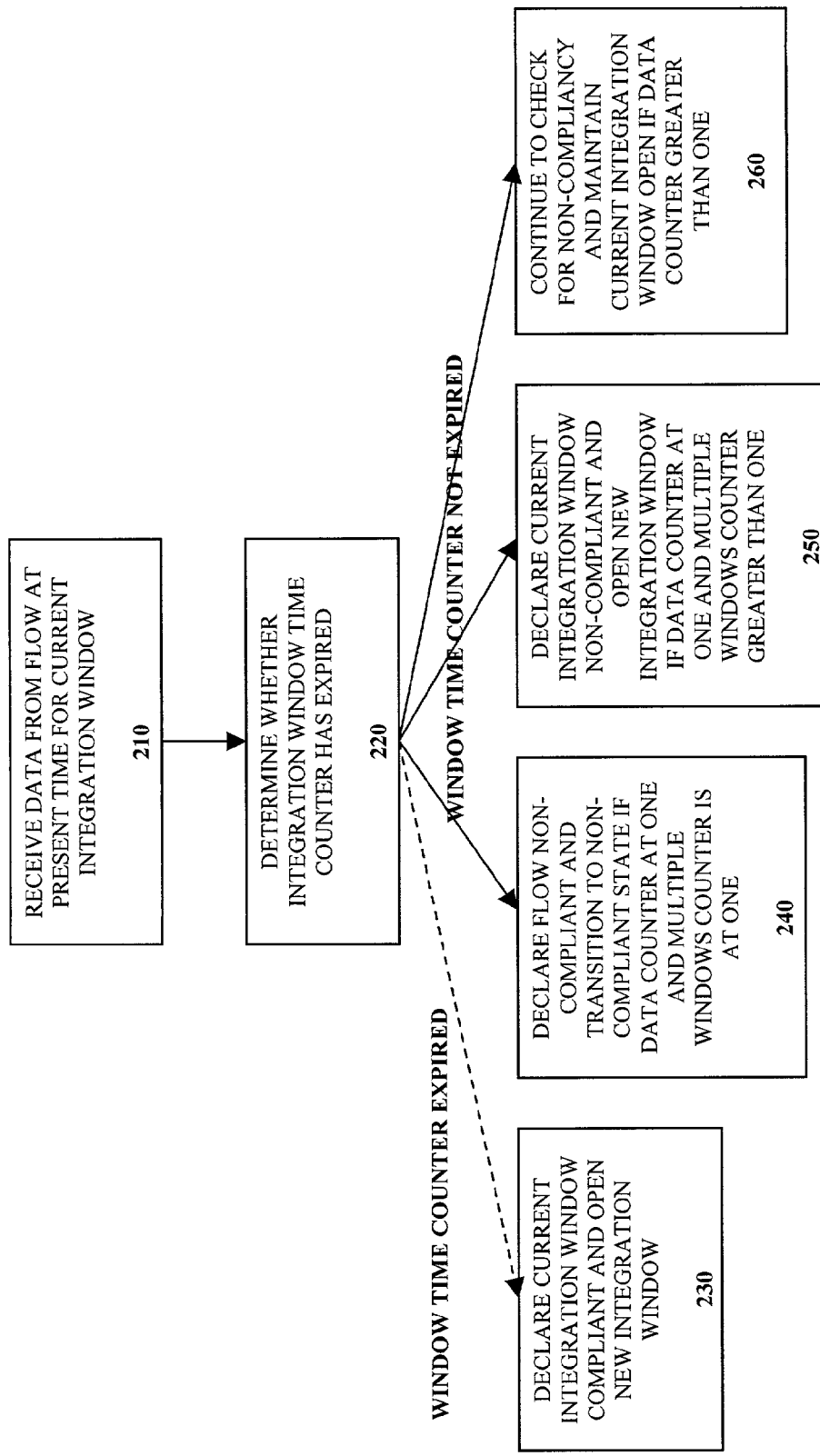
FIG. 2 illustrates a flow chart diagram of non-compliancy checking while in a compliant state according to an embodiment of the present invention.

FIG. 2 illustrates a flow chart diagram of non-compliancy checking while in a compliant state according to an embodiment of the present invention. M-byte data from flow X is received 210 at present time (T) for a current integration window. It is determined 220 whether the integration window time counter (WCNT) has expired. That is, the integration window time counter (WCNT) is subtracted by a lapsed time interval. The lapsed time interval is determined by subtracting the present time value (T) by the time stamp value (TS); the time stamp value (TS) being the arrival time of the previous M-byte data from flow X. The integration window time counter has expired if the value of the integration window time counter (WCNT) subtracted by the lapsed time interval is less than or equal to zero (WCNT−(T−TS)≦0). The integration window time counter has not expired if the value of the integration window time counter (WCNT) subtracted by the lapsed time interval is greater than zero (WCNT−(T−TS)>0).

If the integration window time counter (WCNT) has expired, then the current integration window is declared 230 compliant and a new integration window is opened. The integration window time counter (WCNT) is set to the integration window time threshold in compliant state (WCNT_C_INIT), the multiple windows counter (MWCNT) is set to the multiple windows counter threshold in compliant state (MWCNT_C_INIT), the data counter (MBCNT) is set to the data counter threshold in compliant state (MBCNT_C_INIT), and the time stamp value (TS) is updated to the present time value (T).

If the integration window time counter (WCNT) has not expired and the data counter (MBCNT) is at one (at one count from expiring only one more M-byte is allowed), then if the multiple windows counter (down-counter) (MWCNT) is at one (at one count from expiring), the flow is declared 240 non-compliant and transitions to the non-compliant state 120. In the transition state 112 to the non-compliant state 120, the integration window time counter (WCNT) is set to the integration window time threshold in non-compliant state (WCNT_N_INIT), the multiple windows counter (MWCNT) is set to the multiple windows counter threshold in non-compliant state (MWCNT_N_INIT), the data counter (MBCNT) is set to the data counter threshold in non-compliant state (MBCNT_N_INIT), and the time stamp value (TS) is updated to the present time value (T).

Alternatively, if the integration window time counter (WCNT) has not expired and the data counter (MBCNT) is at one (at one count from expiring), then if the multiple windows counter (MWCNT) is greater than one (at least two counts from expiring), the current integration window is declared 250 non-compliant and a new integration window is opened. The multiple windows counter (down-counter) (MWCNT) is decremented by one (MWCNT−1), the integration window time counter (WCNT) is set to the integration window time threshold in compliant state (WCNT_C_INIT), the data counter (MBCNT) is set to the data counter threshold in compliant state (MBCNT_C_INIT), and the time stamp value (TS) is updated to the present time value (T).

Finally, if the integration window time counter (WCNT) has not expired and the data counter (MBCNT) is greater than one (at least two counts from expiring), then non-compliancy is continued to be checked 260 and the current integration window is maintained open. The integration window time counter (WCNT) is set to the integration window time counter subtracted by the lapsed time interval (WCNT−(T−TS)), the data counter (MBCNT) is decremented by one (MBCNT−1), the multiple windows counter (MWCNT) does not change, and the time stamp value (TS) is updated to the present time value (T).

Figure 3:
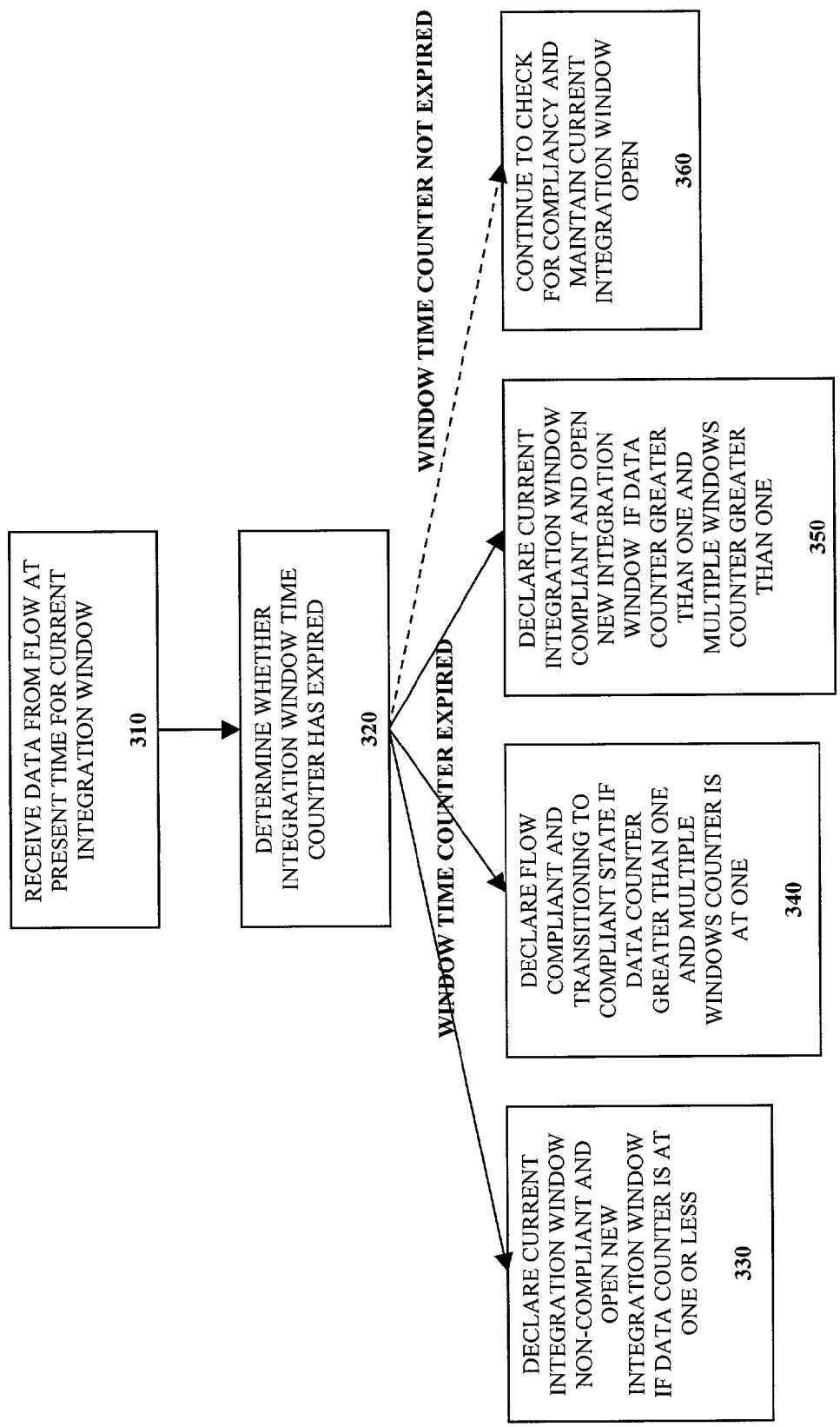
FIG. 3 illustrates a flow chart diagram of compliancy checking while in a non-compliant state according to an embodiment of the present invention.

FIG. 3 illustrates a flow chart diagram of compliancy checking while in a non-compliant state according to an embodiment of the present invention. M-byte data from flow X is received 310 at present time (T) for a current integration window. It is determined 320 whether the integration window time counter (WCNT) has expired. That is, the integration window time counter (WCNT) is subtracted by a lapsed time interval. The lapsed time interval is determined by subtracting the present time value (T) by the time stamp value (TS); the time stamp value (TS) being the arrival time of the previous M-byte data from flow X. The integration window time counter has expired if the value of the integration window time counter (WCNT) subtracted by the lapsed time interval is less than or equal to zero (WCNT−(T−TS)≦0). The integration window time counter (WCNT) has not expired if the value of the integration window time counter (WCNT) subtracted by the lapsed time interval is greater than zero (WCNT−(T−TS)>0).

If the integration window time counter (WCNT) has expired and the data counter (MBCNT) is at one or less (at one-or-less count from expiring), then the current integration window is declared 330 non-compliant and a new integration window is opened. The integration window time counter (WCNT) is set to the integration window time threshold in non-compliant state (WCNT_N_INIT), the multiple windows counter (MWCNT) is set to the multiple windows counter threshold in non-compliant state (MWCNT_N_INIT), the data counter (MBCNT) is set to the data counter threshold in non-compliant state (MBCNT_N_INIT), and the time stamp value (TS) is updated to the present time value (T).

If the integration window time counter (WCNT) has expired and the data counter (MBCNT) is greater than one (at least two counts from expiring), then if the multiple windows counter (down-counter) (MWCNT) is at one (at one count from expiring), the flow is declared 340 compliant and transitions to the compliant state 110. In the transition state 122 to the compliant state 110, the integration window time counter (WCNT) is set to the integration window time threshold in compliant state (WCNT_C_INIT), the multiple windows counter is set to the multiple windows counter threshold in compliant state (MWCNT_C_INIT), the data counter (MBCNT) is set to the data counter threshold in compliant state (MBCNT_C_INIT), and the time stamp value (TS) is updated to the present time value (T).

Alternatively, if the integration window time counter (WCNT) has expired and the data counter (MBCNT) is greater than one (at least two counts from expiring), then if the multiple windows counter (down-counter) (MWCNT) is greater than one (at least two counts from expiring), the current integration window is declared 350 compliant and a new integration window is opened. The multiple windows counter (MWCNT) is decremented by one (MWCNT−1), the integration window time counter (WCNT) is set to the integration window time threshold in non-compliant state (WCNT_N_INIT), the data counter (MBCNT) is set to the data counter threshold in non-compliant state (MBCNT_N_INIT), and the time stamp value (TS) is updated to the present time value (T).

Finally, if the integration window time counter (WCNT) has not expired, then compliancy is continued to be checked 260 and the current integration window is maintained open. The integration window time counter (WCNT) is set to the integration window time counter subtracted by the lapsed time interval (WCNT−(T−TS)), the data counter (MBCNT) is decremented by one (MBCNT−1) if the data counter (MBCNT) is greater than one (at least two counts from expiring), the data counter (MBCNT) is set to zero (MBCNT=0) if the data counter is not greater than one (at one-or-less count from expiring), and the time stamp value (TS) is updated to the present time value (T).

As discussed above, the threshold values (INIT) are fixed, but may be individually adjusted for each application depending on the level of accuracy required. Each of the above ten parameters are preferably defined for each flow and are stored in an external control memory.

In one particular example, the following values are set:
WCNT_C_INIT=WCNT_N_INIT=integration window maximum size (unit=number of clock cycles)=I=2exp (W), with W coded over 5 bits
WCNT=integration window counter (number of clock cycles), with 32-bit coding
TS=time stamp value, with 32-bit encoding
MBCNT_C_INIT (X)=MBCNT_N_INIT (Y)=threshold value for compliancy/non-compliancy checking (unit is number of M-byte of data)=2exp(N), with N coded over 4 bits (e.g., from 0 to 14)
MBCNT=receive data M-byte counter (14-bit)
MWCNT_C_INIT=MWCNT_N_INIT=C=minimum number of consecutive windows violating/not-violating (non-compliant/compliant with) the rate policing (3-bit)
MWCNT=consecutive windows counter (3-bit)
State Machine Status=flow rate violated/not violated These parameters may be defined for each flow, and preferably stored in an external control memory. Therefore, if there are more than X*M bytes received over an integration time of WCNT_C_INIT clock periods, and this occurrence for C consecutive times, then the current flow is violating its rate policing (the maximum allowed rate) and it is in the non-compliant state 110 (see FIG. 1). When in the non-compliant state 110, if less than Y*M bytes are received over an integration period of WCNT_N_INIT clock periods, the rate is not violated and it is in the compliant state 120 (see FIG. 1). The violation or non-compliant state typically only changes across packet boundaries.

The parameters in the above example are set in this specific instance where WCNT_C_INIT=WCNT_N_INIT, MBCNT_C_INIT=MBCNT_N_INIT, and MWCNT_C_INIT=MWCNT_N_INIT in order to limit the number of control bit information to be stored in the control memory for a particular flow to check its rate compliancy. For example, there may be up to 256K packet flows to process, and it is necessary to store 256,000×UU control bits in the control memory, such as in an external Synchronous Static Random Access Memory (SSRAM), or any suitable memory device. In this above example, 91 bits are sufficient to be stored per packet flow, however, more control bits would provide greater accuracy for the rate policing algorithm.

Finer granularity enables more accurate rate policing, although it will increase the complexity and the amount of information to store in the control memory. The granularity described above is generally sufficient for most applications. The M value discussed above indicates the granularity used by the packet rate policing. The M value defines the granularity or the number of byte(s) used as the smallest unit to be accounted for in the rate policing calculation. The M value is not specific per flow usually, but is typically a global parameter.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of flow rate-based policy checking for non-compliancy, comprising:

receiving data from a flow at a present time for a current integration window;

determining whether an integration window time counter has expired based on a lapsed time interval;

declaring the current integration window compliant and opening a new integration window if the integration window time counter has expired;

declaring the flow non-compliant and transitioning to a non-compliant state if the integration window time counter has not expired, one more unit of data is remaining, and one more integration window cycle is remaining;

declaring the current integration window non-compliant and opening the new integration window if the integration window time counter has not expired, one more unit of data is remaining, and at least two integration window cycles are remaining; and continuing to check for non-compliancy and maintaining the current integration window open if the integration window time counter has not expired and at least two units of data are remaining, wherein declaring the current integration window non-compliant and opening the new integration window includes:

decrementing the multiple windows counter by one, setting the integration window time counter to that of an integration window time threshold, setting the data counter to that of a data counter threshold, and setting a previous time stamp to that of the present time.

2. The method according to claim 1, wherein the lapsed time interval is the present time subtracted by a previous time stamp.

3. A method of flow rate-based policy checking for compliancy, comprising:
receiving data from a flow at a present time for a current integration window;
determining whether an integration window time counter has expired based on a lapsed time interval;
declaring the current integration window non-compliant and opening a new integration window if the integration window time counter has expired and one-or-less unit of data is remaining;
declaring the flow compliant and transitioning to a compliant state if the integration window time counter has expired, at least two units of data are remaining, and one more integration window cycle is remaining;
declaring the current integration window compliant and opening the new integration window if the integration window time counter has expired, at least two units of data are remaining, and at least two integration window cycles are remaining; and
continuing to check for compliancy and maintaining the current integration window open if the integration window time counter has not expired,
wherein declaring the current integration window non-compliant and opening the new integration window includes:
decrementing the multiple windows counter by one,
setting the integration window time counter to that of an integration window time threshold,
setting the data counter to that of a data counter threshold, and
setting a previous time stamp to that of the present time.

4. The method according to claim 3, wherein the lapsed time interval is the present time subtracted by a previous time stamp.

5. A program code storage device, comprising:
a computer readable medium; and
computer readable program codes, stored on the computer readable medium, said computer executable program codes being executed by a computer to:
receive data from a flow at a present time for a current integration window;
determine whether an integration window time counter has expired based on a lapsed time interval;
declare the current integration window compliant and open a new integration window if the integration window time counter has expired;
declare the flow non-compliant and transition to a non-compliant state if the integration window time counter has not expired, one more unit of data is remaining, and one more integration window cycle is remaining; declare the current integration window non-compliant and open the new integration window if the integration window time counter has not expired, one more unit of data is remaining, and at least two integration window cycles are remaining; and
continue to check for non-compliancy and maintain the current integration window open if the integration window time counter has not expired and at least two units of data are remaining,
wherein continuing to check for non-compliancy and maintaining the current integration window open includes:
setting the integration window time counter to that of the integration window time counter subtracted by the lapsed time interval,
decrementing the data counter by one,
maintaining the multiple windows counter constant, and
setting a previous time stamp to that of the present time.

6. The program code storage device according to claim 5, wherein the lapsed time interval is the present time subtracted by a previous time stamp.

7. A program code storage device, comprising:
a computer readable medium; and
computer readable program codes, stored on the machine-readable storage medium, said computer executable program codes being executed by a computer to:
receive data from a flow at a present time for a current integration window;
determine whether an integration window time counter has expired based on a lapsed time interval;
declare the current integration window non-compliant and open a new integration window if the integration window time counter has expired and one-or-less unit of data is remaining;
declare the flow compliant and transition to a compliant state if the integration window time counter has expired, at least two units of data are remaining, and one more integration window cycle is remaining;
declare the current integration window compliant and open the new integration window if the integration window time counter has expired, at least two units of data are remaining, and at least two integration window cycles are remaining; and
continue to check for compliancy and maintain the current integration window open if the integration window time counter has not expired,
wherein continuing to check for non-compliancy and maintaining the current integration window open includes:
setting the integration window time counter to that of the integration window time counter subtracted by the lapsed time interval,
decrementing the data counter by one,
maintaining the multiple windows counter constant, and
setting a previous time stamp to that of the present time.

8. The program code storage device according to claim 7, wherein the lapsed time interval is the present time subtracted by a previous time stamp.

9. A method of flow rate-based policy checking for non-compliancy, comprising:
receiving data from a flow at a present time for a current integration window;
subtracting an integration window time counter by a lapsed time interval to determine whether the integration window time counter has expired;
declaring the current integration window compliant and opening a new integration window if the integration window time counter has expired;
declaring the flow non-compliant and transitioning to a non-compliant state if the integration window time counter has not expired, a data counter is at one, and a multiple windows counter is at one;
declaring the current integration window non-compliant and opening the new integration window if the integration window time counter has not expired, the data counter is at one, and the multiple windows counter is greater than one; and
continuing to check for non-compliancy and maintaining the current integration window open if the integration window time counter has not expired and the data counter is greater than one, wherein declaring the current integration window non-compliant and opening the new integration window includes:

decrementing the multiple windows counter by one, setting the integration window time counter to that of an integration window time threshold, setting the data counter to that of a data counter threshold, and setting a previous time stamp to that of the present time.

10. The method according to claim 9, wherein the lapsed time interval is the present time subtracted by a previous time stamp.

11. The method according to claim 9, wherein declaring the current integration window compliant and opening the new integration window includes:
  setting the integration window time counter to that of an integration window time threshold;
  setting the multiple windows counter to that of a multiple windows counter threshold;
  soiling the data counter to that of a data counter threshold; and
  setting a previous time stamp to that of the present time.

12. The method according to claim 9, wherein transitioning to the non-compliant state includes:
  setting the integration window time counter to that of an integration window time threshold;
  setting the multiple windows counter to that of a multiple windows counter threshold;
  setting the data counter to that of a date counter threshold; and
  setting a previous time stamp to that of the present time.

13. The method according to claim 9, wherein continuing to check for non-compliancy and maintaining the current integration window open includes:
  setting the integration window time counter to that of the integration window time counter subtracted by the lapsed time interval;
  decrementing the data counter by one;
  maintaining the multiple windows counter constant; and
  sewing a previous time stamp to that of the present time.

14. A method of flow rate-based policy checking for compliancy, comprising:
  receiving data from a flow at a present time for a current integration window;
  subtracting an integration window time counter by a lapsed time interval to determine whether the integration window time counter has expired;
  declaring the current integration window non-compliant and opening a new integration window if the integration window time counter has expired and a data counter is at one or less;
  declaring the flow compliant and transitioning to a compliant state if the integration window time counter has expired, the data counter is greater than one, and a multiple windows counter is at one;
  declaring the current integration window compliant and opening the new integration window if the integration window time counter has expired, the data counter is greater than one, and the multiple windows counter is greater than one; and
  continuing to check for compliancy and maintaining the current integration window open if the integration window time counter has not expired,
  wherein declaring the current integration window compliant and opening the new integration window includes:
  decrementing the multiple windows counter by one,
  setting the integration window time counter to that of an integration window time threshold,
  setting the data counter to that of a data counter threshold, and
  setting a previous time stamp to that of the present time.

15. The method according to claim 14, wherein the lapsed time interval is the present time subtracted by a previous time stamp.

16. The method according to claim 14, wherein declaring the current integration window non-compliant and opening the new integration window includes:
  setting the integration window time counter to that of an integration window time threshold;
  setting the multiple windows counter to that of a multiple windows counter threshold;
  setting the data counter to that of a data counter threshold; and
  setting a previous time stamp to that of the present time.

17. The method according to claim 14, wherein transitioning to the compliant state includes:
  setting the integration window time counter to that of an integration window time threshold;
  setting the multiple windows counter to that of a multiple windows counter threshold;
  setting the data counter to that of a data counter threshold; and
  selling a previous time stamp to that of the present time.

18. The method according to claim 14, wherein continuing to check for compliancy and maintaining the current integration window open includes:
  selling the integration window time counter to that of the integration window time counter subtracted by the lapsed time interval;
  decrementing the data counter by one if the data counter is greater than one;
  selling the data counter to zero if the data counter is not greater than one;
  maintaining the multiple windows counter constant; and
  selling a previous time stamp to that of the present time.

19. A program code storage device, comprising:
  a computer readable medium; and
  computer readable program codes, stored on the computer readable medium, said computer executable program codes being executed by a computer to:
    receive data from a flow at a present time for a current integration window;
    subtract an integration window time counter by a lapsed time interval to determine whether the integration window time counter has expired;
    declare the current integration window compliant and open a new integration window if the integration window time counter has expired;
    declare the flow non-compliant and transition to a non-compliant state if the integration window time counter has not expired, a data counter is at one, and a multiple windows counter is at one;
    declare the current integration window non-compliant and open the new integration window if the integration window time counter has not expired, the data counter is at one, and the multiple windows counter is greater than one; and
    continue to check for non-compliancy and maintain the current integration window open if the integration window time counter has not expired and the data counter is greater than one, wherein causing the computer to declare the current integration window non-compliant and open the new integration window further cause the computer to:
decrement the multiple windows counter by one,
set the integration window time counter to that of an integration window time threshold,
set the data counter to that of a data counter threshold, and
set a previous time stamp to that of the present time.

20. The program code storage device according to claim 19, wherein the lapsed time interval is the present time subtracted by a previous time stamp.

21. The program code storage device according to claim 19, wherein the instructions to declare the current integration window compliant and open the new integration window further include instructions to:
set the integration window time counter to that of an integration window time threshold;
set the multiple windows counter to that of a multiple windows counter threshold;
set the data counter to that of a data counter threshold; and
set a previous time stamp to that of the present time.

22. The program code storage device according to claim 19, wherein the instructions to transition to the non-compliant state further include instructions to:
set the integration window time counter to that of an integration window time threshold;
set the multiple windows counter to that of a multiple windows counter threshold;
set the data counter to that of a data counter threshold; and
set a previous time stamp to that of the present time.

23. The program code storage device according to claim 19, wherein the instructions to continue to check for non-compliancy and maintain the current integration window open further include instructions to:
set the integration window time counter to that of the integration window time counter subtracted by the lapsed time interval;
decrement the data counter by one;
maintain the multiple windows counter constant; and
set a previous time stamp to that of the present time.

24. A program code storage device, comprising:
a computer readable medium; and
computer readable program codes, stored on the computer readable medium, said computer executable program codes being executed by a computer to:
receive data from a flow at a present time for a current integration window;
subtract an integration window time counter by a lapsed time interval to determine whether the integration window time counter has expired;
declare the current integration window non-compliant and open a new integration window if the integration window time counter has expired and a data counter is at one or less;
declare the flow compliant and transition to a compliant state if the integration window time counter has expired, the data counter is greater than one, and a multiple windows counter is at one;
declare the current integration window compliant and open the new integration window if the integration window time counter has expired, the data counter is greater than one, and the multiple windows counter is greater than one; and
continue to check for compliancy and maintain the current integration window open if the integration window time counter has not expired, wherein causing the computer to declare the current integration window compliant and open the new integration window further causes the computer to:
decrement the multiple windows counter by one,
set the integration window time counter to that of an integration window time threshold,
set the data counter to that of a data counter threshold, and
set a previous time stamp to that of the present time.

25. The program code storage device according to claim 24, wherein the lapsed time interval is the present time subtracted by a previous time stamp.

26. The program code storage device according to claim 24, wherein the instructions to declare the current integration window non-compliant and open the new integration window further include instructions to:
set the integration window time counter to that of an integration window time threshold;
set the multiple windows counter to that of a multiple windows counter threshold;
set the data counter to that of a data counter threshold; and
set a previous time stamp to that of the present time.

27. The program code storage device according to claim 24, wherein the instructions to transition to the compliant state further include instructions to:
set the integration window time counter to that of an integration window time threshold;
set the multiple windows counter to that of a multiple windows counter threshold;
set the data counter to that of a data counter threshold; and
set a previous time stamp to that of the present time.

28. The program code storage device according to claim 24, wherein the instructions to continue to check for compliancy and maintain the current integration window open further include instructions to:
set the integration window time counter to that of the integration window time counter subtracted by the lapsed time interval;
decrement the data counter by one if the data counter is greater than one;
set the data counter to zero if the data counter is not greater than one;
maintain the multiple windows counter constant; and
set a previous time stamp to that of the present time.

* * * * *